United States Patent [19]

Lerch et al.

[11] Patent Number: 4,528,853

[45] Date of Patent: Jul. 16, 1985

[54] ULTRASONIC SENSOR

[75] Inventors: Reinhard Lerch, Erlangen; Günther Gräbner, Baiersdorf, both of Fed. Rep. of Germany

[73] Assignee: Siemens Aktiengesellschaft, Munich, Fed. Rep. of Germany

[21] Appl. No.: 602,394

[22] Filed: Apr. 20, 1984

[30] Foreign Application Priority Data

Jun. 9, 1983 [DE] Fed. Rep. of Germany ....... 3320935

[51] Int. Cl.[3] .............................................. G01N 29/00

[52] U.S. Cl. ........................................ 73/624; 73/628; 310/335; 310/800; 367/93; 367/151

[58] Field of Search ................. 73/624, 627, 628, 642; 310/335, 800; 367/93, 94, 99, 117, 151

[56] References Cited

U.S. PATENT DOCUMENTS

| | | | |
|---|---|---|---|
| 3,106,839 | 10/1963 | Sansom | 73/642 |
| 3,163,784 | 12/1964 | Renaut | 73/624 |
| 3,912,954 | 10/1975 | Baird | 367/151 |
| 4,440,983 | 4/1984 | Facoetti et al. | 310/800 |

FOREIGN PATENT DOCUMENTS 55-93394 7/1980 Japan .

*Primary Examiner*—Stephen A. Kreitman
*Attorney, Agent, or Firm*—Kenyon & Kenyon

[57] ABSTRACT

An ultrasonic sensor for determining objects in air or other gaseous media is disclosed. The sensor comprises a first ultrasonic transducer having a piezoelectric transmitter. A reflector is provided having a concave surface facing the first ultrasonic transducer which forms a segment of an ellipsoid. The reflector has two focal points, the first of which is closer to the reflector and the second of which is near the object to be detected. Between the first ultrasonic transducer and the reflector, a second ultrasonic transducer is provided which is arranged at the first focal point of the reflector. Preferably, the surface of the second ultrasonic transducer facing the reflector forms a spherical segment. By this arrangement, an increase of the receiving aperture is achieved, and objects can be determined which have a normal to the reflection surface inclined with respect to the axis of the sound lobe by an object position angle which is substantially larger than ±3°. Additionally, objects with a curved reflection surface can be determined unambiguously.

6 Claims, 4 Drawing Figures

ULTRASONIC SENSOR

BACKGROUND OF THE INVENTION

The present invention relates to the field of ultrasonic sensors, and particularly to an ultrasonic sensor for determining objects in air or other gaseous media and which contains a first ultrasonic transducer having a piezoelectric body as the transmitter.

Sensors are devices which are designed so that they can detect or quantitatively determine physical parameters such as pressure, temperature, position or velocity over a measuring range. Due to the growth of electronic industrial process control systems, the demand for more complex sensors at relatively low prices has increased. a suitable sensor is, for instance, an ultrasonic proximity switch which can detect the presence of objects or persons. Other types of sensors, such as inductive or capacitive proximity switches, pose problems in switching ranges of 100 cm. Furthermore, ultrasonic proximity switches can also determine the presence of small objects with higher security against interference. Practically all materials are suitable for this type of object determination.

For such ultrasonic echo sounding systems, ultrasonic transducers are provided which generate a ray of sound with a particularly small aperture angle. Interfering reflections of the ultrasonic energy can thereby be avoided so that particularly high resolution can be achieved and objects located close to each other can be distinguished. In an ultrasonic transducer, the dimensions are essentially given by the operating frequency provided and the material of the transducer. The dimensions of the ultrasonic transducer also determine the size of the sound radiating area of the transducer, the aperture angle of the sound ray generated being determined essentially by the size of the sound-radiating surface. For an operating frequency of about 49 kHz and lead zirconate-titanate PZT as material for the transducer, an aperture angle of about 10° to 12° is obtained, for instance.

An ultrasonic transducer is known which contains a peizoelectric body, a $\lambda/4$ matching layer and a loading ring, where $\lambda$ is the wavelength. On one end face of the piezoelectric body, the $\lambda/4$ matching layer is arranged, the diameter of which is substantially larger than the diameter of the piezoelectric body. The surface region of the $\lambda/4$ matching layer which extends beyond the edge of the piezoelectric body is provided with the loading ring. See, e.g., German DE-AS No. 24 41 492. It is achieved by the provision of a loading ring that a large area, the dimensions of which are substantially larger than the end face of the piezoelectric body, is excited to in-phase vibrations.

Further known is an ultrasonic proximity switch which operates as a distance sensor without touch or contact. The heart of this proximity switch is a piezoceramic ultrasonic transducer which operates in air or other gases. In the mode of operation as a proximity switch, the object to be determined is used as an ultrasonic reflector, where the usable detection range is between 20 and 100 cm and the unusable near range is between 0 and 20 cm. The objects to be determined may be solid, liquid or in powder form with a plane, smooth, polished or mat surface. The material on these surfaces may, in addition, be transparent or be of any color. See, e.g., H. CH. Muenzing "Range Sensor for Large Switching Distances", ETZ, vol. 103 (1982) No. 10, pages 518–519. This known ultrasonic proximity switch only detects objects which are suitable for reflection and the reflection surface of which is arranged perpendicularly to the axis of the sound lobe within the 50% width. Deviations of no more than ±3° from the perpendicular to the axis of the sound lobe are permissible.

SUMMARY OF THE INVENTION

It is accordingly an object of the present invention to provide an ultrasonic sensor for determining objects in air or other gaseous media, the receiving aperture of which is increased so that objects having a normal to the reflection surface inclined relative to the axis of the sound lobe by an object position angle which is substantially larger than ±3°, can also be detected. It should also be possible to determine unequivocally objects having a curved reflection surface.

These and other objects of the present invention are achieved by an ultrasonic sensor for determining objects in a gaseous medium comprising first ultrasonic transducer means including piezoelectric transmitting means, reflector means having a concave surface facing the first ultrasonic transducer means, the concave surface forming a segment of an ellipsoid and having first and second focal points, the first focal point being closer to said concave surface than said second focal point, and second ultrasonic transducer means disposed between the first ultrasonic transducer means and the reflector means at the first focal point of the reflector means. Due to the fact that the surface facing the first ultrasonic transducer means forms a segment of an ellipsoid and the second ultrasonic transducer means is arranged at the first focal point of this ellipsoid, objects can be determined which are located approximately at the second focal point of the ellipsoid and of which the reflection surface normal lies outside the half-width value of the first ultrasonic transducer means. This object position angle depends on the diameter of the reflector means and on the operating distance.

In a further embodiment of the ultrasonic sensor, according to the present invention, the surface of the second ultrasonic transducer means facing the reflector means forms a spherical segment. This segment may comprise several plane transducer elements which are arranged in a bevelled structure. The second ultrasonic transducer means may furthermore contain several ring-shaped transducer elements and a cone, the outside surfaces of which make up the spherical shape. Through this design, sound waves from the solid angle range given by the reflector can be determined by the second ultrasonic transducer means, which are radiated by an object located approximately at the second focal point. Because of the physical extent of the secong ultrasonic transducer means and of the sound lobe of the first ultrasonic transducer means one is not limited only to the working distance, but objects can be determined within a certain depth-of-focus range about the second focal point of the ellipsoid.

In a further advantageous embodiment of the ultrasonic sensor according to the invention, the second ultrasonic transducer means contains a support means which is shaped as a segment of a sphere and a piezoelectric plastic foil which is applied to this spherical segment. The support means is provided an a hard backing with respect to the piezoelectric plastic foil. This piezoelectric plastic foil may comprise, for instance, polyvinylidine-flouride PVDF. In this embodiment, a simple design of the second ultrasonic transducer means is obtained.

BRIEF DESCRIPTION OF THE DRAWINGS

The present invention will be described in greater detail in the following detailed description, with reference to the drawings, in which.

DETAILED DESCRIPTION

Figure 1:
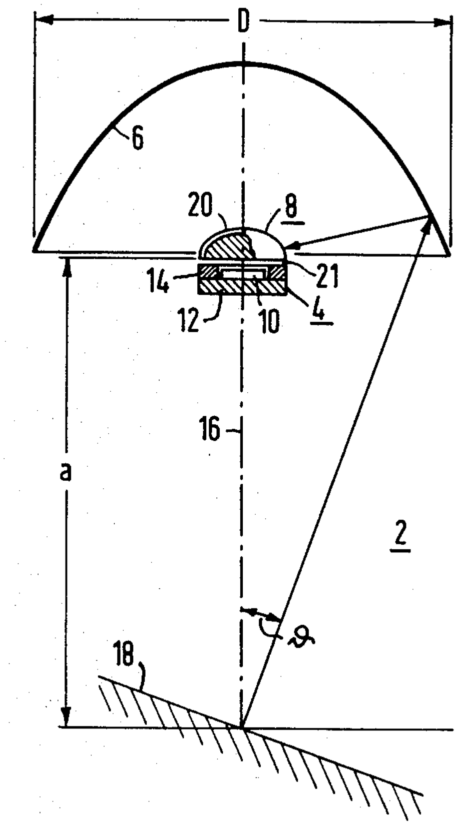
FIG. 1 is a schematic diagram showing the arrangement of an ultrasonic sensor according to the present invention.

With reference now to the drawings, in the embodiment shown in FIG. 1, an ultrasonic sensor 2 for determining objects in air of other gaseous media is illustrated. This ultrasonic sensor 2 includes a first ultrasonic transducer 4, a reflector 6 and a second ultrasonic transducer 8. The first ultrasonic transducer 4 contains a disc-shaped piezoelectric body 10 which is provided with a $\lambda/4$ matching layer 12 which has, for instance, substantially larger dimensions than the piezoelectric body 10. The overhanging region of the $\lambda/4$ matching layer 12 is connected on the side of the piezoelectric body 10 to a loading ring 14. The $\lambda/4$ matching layer 12 consists of a material, the acoustic sound wave impedance of which has a magnitude which is between the magnitude of the sound wave impedance of the piezoelectric body 10 and the magnitude of the sound wave impedance of the medium in which the sound is to propagate.

The surface of the reflector 6 which faces the first ultrasonic transducer 4, forms a segment of an ellipsoid. At the first focal point, i.e., at the focal point near the reflector, the second ultrasonic transducer 8 is arranged. The diameter D of the reflector 6 depends on the distance a to the object 18 which indicates the distance between the two focal points of the ellipsoid, and on the possible object position angle $\theta$, the angle which is enclosed between the axis 16 of the sound lobe and the normal to the reflection surface of the object 18 to be determined. The relationship of the diameter D, the object distance a and the object position angle $\theta$ can be represented by the following equation $$\theta = \tan^{-1}(D/2a)$$

In the design of the ultrasonic sensor 2 for the near range (i.e., the object range a is approximately 20 cm and the diameter D of the reflector is determined as about 10 cm), an angle of, for instance, about $\pm 14°$ is obtained as the object position angle. In the design of the ultrasonic sensor 2 for the far range, an angle of, for instance about $\pm 7°$ is obtained for the object position angle $\theta$ with a predetermined object range a of approximetely 80 cm and a predetermined diameter D of approximately 20 cm.

The second ultrasonic transducer 8 is arranged at the first focal point of the reflector 6. The surface 20 of this second ultrasonic transducer 8, facing the reflector 6, may form a spherical surface. The surface 21 of the second ultrasonic transducer 8, facing away from the reflector 6, is arranged parallel to the end faces of the first ultrasonic transducer 4.

Through this curvature of the receiving surface of the ultrasonic sensor 2, objects 18 which are located in air or other gases and of which the normal to the reflection surface is inclined by an object position angle $\theta$ to the axis 16 of the sound lobe can be determined and also objects with a curved reflection surface can be determined unambiguously.

Figure 2:
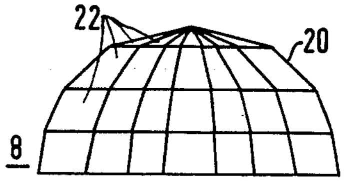
FIG. 2 is a side view of one embodiment of the second ultrasonic transducer according to the present invention.

FIG. 2 shows an embodiment of the second ultrasonic transducer 8 which is arranged at the first focal point of the reflector 6. The surface 20 facing the reflector 6 of this second ultrasonic transducer 8 forms a spherical segment. This spherical segment comprises several transducer elements 22 which are arranged in a bevelled structure as shown.

Figure 3:
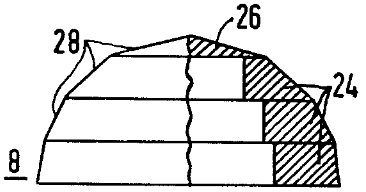
FIG. 3 is a side view of a further embodiment of the second ultrasonic transducer.

In a further embodiment of the second ultrasonic transducer 8, as shown in FIG. 3, the latter contains several ring-shaped transducer elements 24 and a top cone 26. The outside surfaces 28 of the ring-shaped transducer elements 24 and of the cone 26 make up the spherical shape of the second ultrasonic transducer 8.

By means of these embodiments, ultrasonic waves from the solid angle range given by the reflector 6 can be determined.

Figure 4:
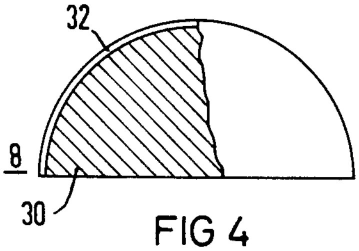
FIG. 4 is a side view of yet another embodiment of the second ultrasonic transducer.

In an advantageous further embodiment of the second ultrasonic transducer 8, as shown in FIG. 4, the latter contains a support means 30 and a piezoelectric plastic foil 32. The support means 30 has the shape of a spherical segment and is furthermore provided as a hard backing for the piezoelectric plastic foil 32. The piezoelectric plastic foil 32 is applied to the curved outside surface of the support means 30. This piezoelectric plastic foil 32 may comprise, for instance, polyvinylidene-fluoride PVDF. In this embodiment, a simple design of the second ultrasonic transducer 8 is obtained.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. An ultrasonic sensor for determining objects in air or other gaseous media which contains a first ultrasonic transducer having a piezoelectric body as a transmitting means, the sensor comprising reflector means having a concave surface said first ultrasonic transducer means, said concave surface forming a segment of an ellipsoid and having first and second focal points, the first focal point being closer to said concave surface than said second focal point, and second ultrasonic transducer means comprising receiver means diposed between said first ultrasonic transducer means and said reflector means at the first focal point of said reflector means, the surface of said second ultrasonic transducer means facing said reflector means comprising a convex surface.

2. The ultrasonic sensor recited in claim 1 wherein said surface facing the reflector means forming a spherical segment is approximated by a plurality of plane transducer elements which are arranged in a bevelled structure wherein each of said transducer elements have a plane surface arranged so that the plane surface faces the reflector means.

3. The ultrasonic sensor recited in claim 2 wherein said second ultrasonic transducer means comprises a plurality of ring-shaped concentric transducer elements of decreasing diameter topped by cone means, said transducer elements and cone means having outer surfaces which form said spherical segment.

4. The ultrasonic sensor recited in claim 1, wherein said second ultrasonic transducer means comprises support means forming a segment of sphere facing said reflector means, and piezoelectric plastic foil means forming a coating on said support means.

5. The ultrasonic sensor recited in claim 4, wherein said support means has a curved outer surface forming a spherical segment, and the piezoelectric plastic foil means is disposed on said curved outer surface.

6. The ultrasonic sensor recited in claim 1, wherein said piezoelectric transmitting means has flat sides and said second ultrasonic transducer means has a flat surface facing away from said reflector means arranged parallel to the flat sides of said piezoelectric transmitting means.

* * * * *